Sept. 16, 1941.  W. A. RIDDELL  2,256,355
PHOTOFLASH SYNCHRONIZING DEVICE
Filed Jan. 26, 1940
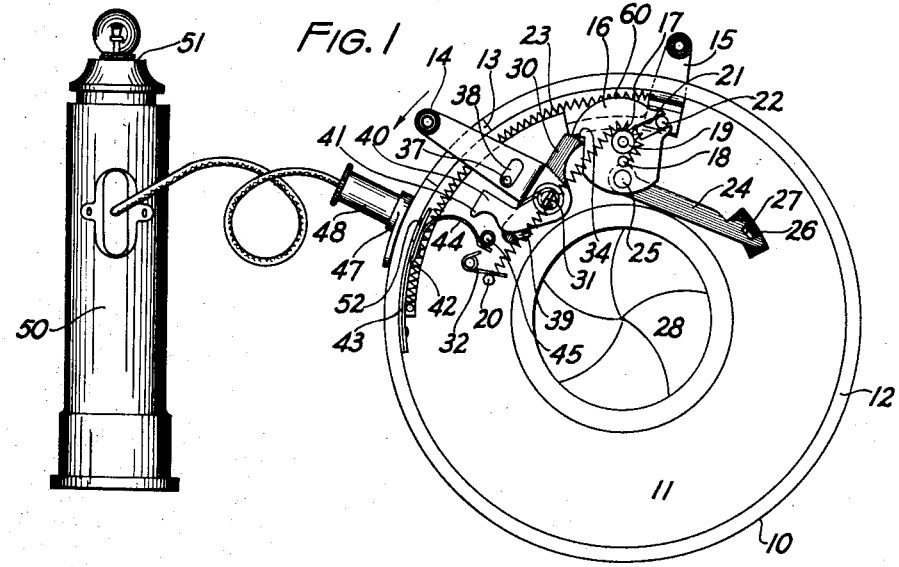
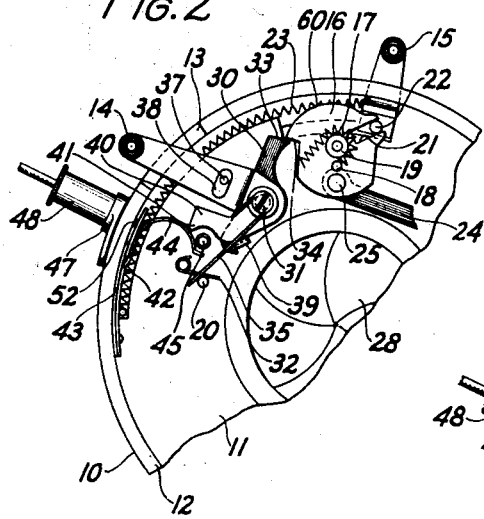
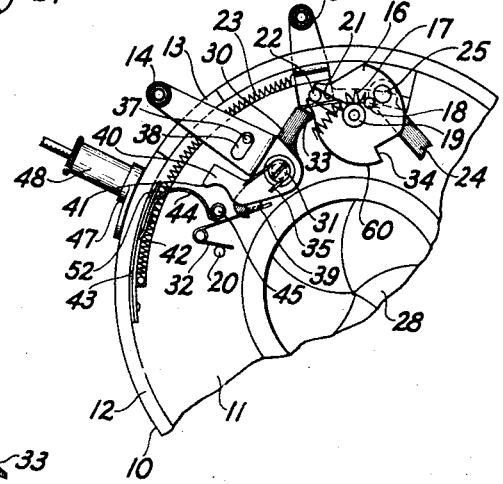
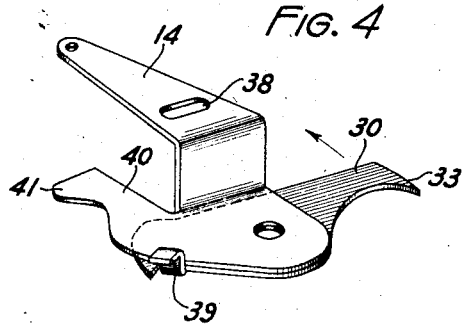
WILLIAM A. RIDDELL
INVENTOR
BY
ATTORNEYS Patented Sept. 16, 1941

2,256,355

UNITED STATES PATENT OFFICE 2,256,355

PHOTOFLASH SYNCHRONIZING DEVICE

William A. Riddell, Rochester, N. Y., assignor to Eastman Kodak Company, Rochester, N. Y., a corporation of New Jersey Application January 26, 1940, Serial No. 315,855

11 Claims. (Cl. 67—29)

The present invention relates to photography, and particularly to a photoflash synchronizing device adapted to give perfect synchronization of shutter opening and lamp flashing when fast shutter speeds are used.

It is well known to those skilled in the art that all flash lamps have an illumination curve based on the time-light characteristics of the same which shows that there is a period after the lamp is excited until the same starts to glow, and after which there is another interval until the lamp reaches its peak of illumination. The peak of illumination may vary in duration depending upon the particular type of lamp under consideration, after which the lamp illumination will drop gradually to zero. Flash lamps having different time-light characteristics are available for use with different types of shutters and different shutter speeds, the major differences in the lamps being found in the peak of illumination characteristics of each. These different lamps vary from those having ultra-long peaks of illumination, and designed particularly for use with focal plane curtain shutter, to those having a sharp peak of illumination and particularly adapted for use with fast shutter speeds; and it is a known fact that the maximum of illumination at the peak of illumination decreases as the duration of the peak of illumination increases.

It will thus be appreciated that when fast shutter speed exposures are to be used that the maximum light is required for a short time, hence a lamp having a sharp peak of illumination is best suited for such exposures. However, since with a lamp having a sharp peak of illumination the duration of the peak at which the shutter must be opened is only short, e. g. .002 to .004 of a second, it is imperative that the synchronization of the shutter and lamp excitation be extremely accurate to insure the shutter being opened at the time to include the peak of illumination.

Generally speaking, all flash lamps are adapted to reach their peak of illumination substantially .020 of a second after the excitation of the lamp so that the proper time of closing of the lamp circuit and the operation of the shutter as controlled by a synchronizing device must account for a "lag" in the lamp, at the time required from the excitation of the lamp to the time it approaches its peak of illumination is herein referred to. When fast shutter speeds are used the opening of the shutter should occur just prior to, or immediately upon, the lamp reaching its peak of illumination so as to include the maximum light during the time that it is opened; hence the "lag" in the lamp to be accounted for at high shutter speeds will be in the neighborhood of .019 to .020 of a second, which means that the synchronizer must be such as to close the lamp circuit, .019 to .020 of a second prior to the operation of the shutter. Strictly speaking, this difference in the time of lamp excitation and shutter operation is not this great because the shutter may have a "lag," as the time required to open after release is often referred to, varying from .004 to .006 of a second which subtracted from the lamp "lag" leaves a time "lag" of .015 to .016 of a second which must be accounted for by the delayed action of the shutter with respect to the excitation of the lamp.

The time-light characteristics of flash lamps, or the construction of different flash lamps, form no part of the present invention, but are merely mentioned to point out the "lag" necessary to be accounted for by synchronizing devices, and particularly by synchronizing devices adapted for use with fast shutter speeds. The time-light characteristics of different lamps and their adaptability for different shutters and shutter speeds are known to those skilled in the art and fully disclosed in advertising literature put out by manufacturers of these flash lamps so that a further disclosure, or graph, of such time-light characteristics for these lamps is not required in this application.

Therefore, one object of the present invention is the provision of a synchronizing device which is adapted for use with fast shutter speeds, or fast exposures as they are sometimes referred to.

Another object is the provision of a device of the type described in which the switch contacts for the lamp circuit are moved in conjunction with the shutter operating mechanism, and which arrangement is recognized as being the most accurate and easy means for insuring accurate synchronization of shutter operation and lamp flashing.

A further object is to provide a synchronizing device which is adapted to close the lamp circuit at a given time prior to the release of the shutter to account for the "lag" characteristics of flash lamps in conjunction with the "lag" found in shutters.

And yet another object is to provide a synchronizing device which is built into the shutter to substantially form an integral part thereof, and wherein a part of the shutter mechanism forms one of the contacts of the lamp circuit.

And still another object is to provide a synchronizing device of the type described wherein the movable contact of the lamp circuit is connected to the shutter trigger to be moved into engagement with a second contact when said trigger is moved to release the latch mechanism holding the shutter in a set position, and wherein the connection between the trigger and latch mechanism is such that the lamp circuit is closed at a given time prior to the release of the shutter operating mechanism.

And yet another object is to provide a synchronizing device of the type described wherein the switch contacts are carried by parts of a shutter mechanism independent of the blade operating mechanism, whereby the engagement of the contacts does not tend to restrain the movement of the shutter operating parts and impair the desired shutter speed.

And another object is to provide a synchronizing device of the type described which is simple in construction, cheap to manufacture, and can be readily incorporated on well-known shutters without difficulty.

The novel features that I consider characteristic of my invention are set forth with particularity in the appended claims. The invention itself, however, both as to its organization and its methods of operation, together with additional objects and advantages thereof, will best be understood from the following description when read in connection with the accompanying drawing in which—

Fig. 1 is a top plan view of a photographic shutter of the setting type showing a preferred embodiment of the synchronizing device constituting the present invention. In this figure the shutter parts are shown in a set position.

Fig. 2 is a partial view corresponding to Fig. 1, and showing the shutter trigger moved towards its release position and at the point in such movement where the lamp circuit is completed but the shutter operating mechanism is not yet released, Fig. 3 is a view corresponding to Figs. 1 and 2, and showing the shutter parts in the position they assume after the shutter has been released, and Fig. 4 is an enlarged detailed perspective showing the connection between the shutter trigger and the latch member for the master member which eliminates the closing of the lamp circuit during the operation of the shutter.

Like reference characters refer to corresponding parts throughout the drawing.

Briefly, the present synchronizing device insures the closing of the lamp circuit at a given time prior to the release of the shutter to account for lamp "lag," and thereby is adapted for use with fast shutter speeds. This "lag" is accounted for by connecting the movable switch contact of the lamp circuit to the shutter trigger in such a way that it is adapted to move said contact into engagement with the second contact during movement of the trigger toward its release position, and providing a lost-motion connection between the trigger and the latch mechanism of the shutter operating mechanism whereby the trigger is adapted to move a sufficient distance to close the lamp circuit prior to releasing the shutter operating mechanism. It is pointed out that while I have chosen to disclose my synchronizing device as incorporated on a between-the-lens type of setting shutter, it could be readily applied to any type of shutter mechanism by providing that the lamp circuit be closed by movement of the trigger in advance of the release of the shutter operating mechanism by said trigger.

Referring now to the drawing, a photographic shutter incorporating my synchronizing device may comprise an annular metal casing 10 having a partition plate 11 and a flange 12 provided with an elongated slot 13 through which the trigger 14 may extend, and also provided with a second slot, not shown, through which the setting lever 15 may extend, said setting lever being adapted to move between a set position, see Fig. 1, and a release position, see Fig. 2, as for the purpose well known in the art. A master member 16 pivoted to the plate 11 is normally rotated counter-clockwise by the power spring 17 connected at one end to a pin 18 on the master member, passing over a pulley 19 on the master member, and connected at the other end to a pin 20 fixed to the plate 11.

The master member 16 is provided with a radial slot 21 with which a pin 22 on the setting lever is adapted to engage so that movement of the setting lever in a clockwise direction to the position shown in Fig. 1 is adapted to rotate the master member to a set position against the action of the power spring 17. The master member is adapted to be held in its set position by a latch mechanism hereinafter described, and when released therefrom moves counter-clockwise rapidly under the influence of spring 17 to operate the shutter blades. The setting lever 15 may be normally moved to its position of rest by the spring 23, so that upon release, the master member 16 will not have to overcome the inertia of the setting lever in rotating to operate the shutter blade. A link 24 pivoted at one end 25 to the master member is provided with a hooked end 26 engaging the pin 27 extending upwardly from the shutter blade operating ring, whereby said blade operating ring is adapted to open and close the shutter blades 28 upon a counter-clockwise rotation of the master member in a well-known manner.

The latch mechanism for releasably holding the master member 16 in its set position may comprise a latch member 30 pivoted on a stud 31 mounted on the plate 11 and normally spring pressed by a spring 32 clockwise so that the nose 33 thereof presses against the edge of the master member 16 to engage a shoulder 34 thereon for holding the master member in a set position. The trigger 14 is also pivoted on the stud 31 in surface contact with the latch member to move independently thereof, and is normally pressed in a clockwise direction to its inoperative position by a spring 35 wrapped around the stud 31 having one end engaging the trigger and the other the pin 20 and the plate 11. Movement of the trigger may be controlled by the engagement between a pin 37 on the plate 11 and a slot 38 in the trigger. So that movement of the trigger counter-clockwise, or against the spring influencing the same, will serve to pivot the latch member counter-clockwise to release said master member, the latch member is provided with a turned up lug 39 which is adapted to be engaged by the trigger when the same is depressed in the direction indicated by the arrow in Fig. 1.

The trigger 14 is provided with an arm 40 the nose portion 41 of which is adapted to form one switch contact of a lamp circuit, and which is adapted, when the trigger is moved to release the shutter, to engage a second contact 42 to complete the lamp circuit. This second contact may be attached to the inside of the flange 12 in any suitable manner, and is insulated from said casing by insulation 43. As shown, that portion 44 of the contact 42 which is adapted to be engaged by contact 41 is resilient and normally moved in a direction toward the contact 41. The normal position of the portion 44 on the contact 42 is determined by a pin 45 insulated, and extending, from the plate 11, and against which the portion 44 is held by the resiliency of the contact 42.

The contacts 41 and 42 are adapted to be electrically connected to opposite sides of an electrical circuit including a flash lamp so that when the contacts 41 and 42 are moved to engagement the circuit to the lamp will be completed. The connection of the contacts 41 and 42 into the circuit may be effected in the manner disclosed in my copending application entitled, Photoflash synchronizing device, Serial No. 296,113, and filed September 22, 1939, or in any other suitable manner. In accordance with the disclosed arrangement the contact 42 is located beneath a threaded socket 47 in the flange 12 of the casing 10 and into which an electrical plug 48 is adapted to be threaded. As fully described in my noted copending application the shell of the plug is adapted to be connected to one side of the circuit including batteries contained in the battery case 50, the lamp socket 51 adapted to receive a flash lamp, but in which I have shown a test lamp, while the other side of the circuit is adapted to be connected to a prong 52 insulated from the shell of the plug. When the plug 48 is screwed into the socket the shell thereof is adapted to be grounded to the metal shutter casing, and subsequently to the contact 41 due to the fact that all of the shutter parts are metal and are in engagement with one another, while the prong 52 is adapted to extend through the casing and into engagement with that portion of the contact 42 lying directly beneath the socket.

Referring to Fig. 1, it will be noticed that when the shutter parts are in the set position the contacts 41 and 42 are separated so that the lamp circuit is open. Now when the trigger 14 is depressed in the direction indicated by the arrow, the trigger moves the nose 41 toward the portion 44 of the contact 42 and finally into engagement therewith to close the lamp circuit. Due to the fact that the latch member 30 must be moved a given distance before the nose 33 thereof releases the master member 16 it will be apparent that the trigger 14 must be moved a substantial distance before the latch member 30 is moved sufficiently thereby to release the master member. The present synchronizing device makes use of this lost motion feature to account for the "lag" in flash lamps, and the contacts 41 and 42 are so disposed relative to one another that they are adapted to be moved into engagement at a given time prior to the release of the master member so as to account for the "lag" characteristics of flash lamps in conjunction with the "lag" found in the particular shutter with which it is associated. This arrangement of contacts will be appreciated by referring to Fig. 2 wherein it will be noticed that the trigger has been moved far enough to bring the switch contacts into engagement to close the lamp circuit, but not far enough to move the latch member a sufficient distance so that the nose 33 thereof releases the master member. The time interval between the closing of the lamp circuit and the release of the master member should be such as to account for the "lag" characteristics of a recommended type of flash lamp in conjunction with the "lag" of the shutter; and where the device is to be used for high speed work the contacts will generally be disposed relative to one another to take care of the "lag" found in lamps having a relatively sharp peak of illumination.

If it is desired to make slower exposures, e. g. 1/50 to 1/100 of a second, then a flash lamp having a longer peak of illumination is required since the shutter will be opened from .020 to .010 of a second which is considerably longer than the peak of illumination of the lamp adapted to fast exposures, which may be only .002 of a second. And since no flash lamp other than those designed for use with focal plane shutters have a peak of illumination the duration of which is .010 to .020 of a second, then the shutter must be opened before the lamp reaches its peak. This method generally means that the "lag" in the lamp to be accounted for with the slower shutter speeds will be less than that with fast shutter speeds, or that the time interval between the completion of the lamp circuit and release of the shutter will be less. This may be accounted for in the present synchronizing device by making the pin 45 adjustable counter-clockwise of the shutter casing from the position shown so that the portion 44 of the contact 42 can be located farther away from the contact 41 when the trigger is in its set position. Such an adjustment will necessarily cut down the interval of time between the closing of the circuit and the release of the shutter. The pin 45 could be spring pressed into one of a series of spaced holes provided in the plate 11, and extend to the outside of the shutter casing so as to be grasped by the operator for movement to the desired position for giving the necessary "lag" between completion of the lamp circuit and operation of the shutter for different shutter speeds.

It will be noticed that the disclosed connection between the trigger 14 and the latch member 30 insures against the contacts being moved into engagement during the setting operation of the shutter. This is true because the trigger 14 is independent of the movement of the latch member 30 so that when the latter is pivoted counter-clockwise during the setting of the shutter due to the nose 33 thereof riding upon the cam surface 60 of the master member adjacent the shoulder thereof such movement is not transmitted to the trigger 14. It will be appreciated that the trigger 14 could include, as an integral part thereof, the nose portion 33 and the latch member without impairing the synchronizing feature of the device. The only disadvantage of such an arrangement would arise from the fact that the contact 41 would be moved into engagement with the contact 42 upon the setting of the shutter, as pointed out above, but this would do no harm if the operator was sure not to place a new flash lamp in the circuit prior to setting the shutter.

From the above description it will be appreciated that a synchronizing device constructed in accordance with the present invention is readily adapted for use with fast shutter speeds, and can be made adaptable for use with all shutter speeds. The compact arrangement of parts makes for a cheap and efficient synchronizing device readily adapted to any shutter. The switch contacts and the lamp circuit are included in the shutter so as to substantially become an integral part of the shutter mechanism, whereby the closing of the lamp circuit is dependent upon the actuation of the shutter mechanism as is recognized to be the most efficient and accurate method of synchronizing the flashing of a lamp with the opening of a shutter. The switch contacts are connected to that part of the shutter mechanism independent of the blade operating mechanism so that their engagement does not in any way tend to restrain the movement of the shutter blade operating mechanism and thereby effect said shutter speed. Consequently this synchronizing device does not alter the shutter operation in any way so that a camera equipped with such a shutter could be used in the regular way for daylight photography without necessitating compensation for the presence of the synchronizing device.

While I have shown and described certain specific embodiments of the present invention, I am fully aware that many modifications thereof are possible. My invention, therefore, is not to be restricted except insofar as is necessitated by the prior art and the spirit of the appended claims.

Having thus described my invention, what I claim is new and desire to secure by Letters Patent of the United States is:

1. In a photoflash synchronizing device the combination of a photographic shutter including an actuating mechanism, a movable shutter trigger for operating said mechanism, a movable contact adapted to be connected to one side of an electrical circuit including a flash lamp, a second contact adapted to be connected to the other side of said circuit and disposed in the path of movement of said movable contact to be engaged thereby to complete said electrical circuit, said movable contact operatively connected to said trigger to be moved in conjunction therewith, whereby said movable contact is adapted to be moved into engagement with said first contact upon movement of said trigger to operate said mechanism and at a given time prior to the operation of said mechanism by said trigger to account for the lag characteristics of flash lamps.

2. In a photoflash synchronizing device the combination of a photographic shutter including a spring operated mechanism, means for setting said shutter, a releasable latch mechanism for holding said shutter in a set position and including a movable shutter trigger, a first contact adapted to be connected to one side of an electrical circuit including a flash lamp, a movable contact adapted to be connected to the other side of said circuit and disposed to engage said first contact to complete said circuit when moved, and means connecting said movable contact to said trigger, whereby said contact is adapted to be moved in conjunction therewith when said trigger is moved to release said shutter operating mechanism, said contacts being so disposed, and said connecting means being such, that the movable contact is adapted to be moved into engagement with said first contact at a given time prior to the release of said shutter operating mechanism.

3. In a photoflash synchronizing device the combination of a photographic shutter including a spring operated mechanism, means for setting said shutter, a releasable latch mechanism for holding said shutter in a set position and including a movable shutter trigger, a first contact adapted to be connected to one side of an electrical circuit including a flash lamp, a movable contact adapted to be connected to the other side of said circuit and disposed to engage said first contact to complete said circuit when moved, means connecting said movable contact to said trigger whereby said contact is adapted to be moved in conjunction therewith when said trigger is moved to release said shutter operating mechanism, said contacts being so disposed, and said connecting means being such, that the movable contact is adapted to be moved into engagement with said first contact at a given time prior to the release of said shutter operating mechanism, and means for preventing the engagement of said contacts during the setting of said shutter.

4. In a photoflash synchronizing device the combination of a photographic shutter including a spring operated mechanism, means for setting said shutter, a releasable latch mechanism for holding said shutter in a set position, and including a latch member normally spring pressed to a latching position, a movable shutter trigger adapted to engage and release said latch member from its latching position, a first contact adapted to be connected to one side of an electrical circuit including a flash lamp, a second contact adapted to be connected to the other side of said circuit and movable from a normal position wherein it is spaced from said first contact into engagement therewith to complete said circuit, and an operative connection between said trigger and said movable contact whereby said contact is adapted to be moved from its normal position in conjunction with movement of said trigger to release said latch, said contacts being so disposed relative to one another, and said operative connection being such, that the movable contact is adapted to be moved into engagement with said first contact at a given time prior to the engagement and release of said latch member by said trigger.

5. In a photoflash synchronizing device the combination of a photographic shutter including a spring operated mechanism means for setting said shutter, a releasable latch mechanism for holding said shutter in a set position and comprising a trigger normally moved to an operative position wherein it is adapted to engage and hold said operating mechanism in a set position, and movable to a release position wherein it releases said operating mechanism, a first contact adapted to be connected to one side of an electrical circuit including a flash lamp, a second contact adapted to be connected to the other side of said circuit and adapted to move into engagement with said first contact to close said circuit, said second contact fixed to said trigger to move therewith and into engagement with said first contact when said trigger is moved toward its release position, said contacts and trigger so disposed relative to one another that said contacts are adapted to be separated when said trigger is in its operative position, and are adapted to be moved into engagement during the movement of said trigger toward its release position and at a given time prior to the release of said operating mechanism by said trigger.

6. In a photoflash synchronizing device the combination of a photographic shutter including a spring actuated master member, means for setting said master member, a trigger adapted to releasably hold said master member in its set position and normally moved to its latching position, a lost-motion connection between said trigger and said master member whereby a given movement of said trigger from its latching position is required before it releases said latch member, a first contact adapted to be connected to one side of an electrical circuit including a flash lamp, a second contact adapted to be connected to the other side of said circuit and movable from a normal position wherein it is separated from said first contact into engagement with the same, said second contact being connected to said trigger to move in conjunction therewith and disposed for engaging said first contact at a given time prior to the release of said master member by said trigger.

7. In a photoflash synchronizing device the combination of a photographic shutter including a spring actuated master member, means for setting said master member, a trigger adapted to releasably hold said master member in its set position and normally moved to its latching position, a lost-motion connection between said trigger and said master member whereby a given movement of said trigger from its latching position is required before it releases said latch member, a first contact adapted to be connected to one side of an electrical circuit including a flash lamp, a second contact adapted to be connected to the other side of said circuit and movable from a normal position wherein it is separated from said first contact into engagement with the same, said second contact being connected to said trigger to move in conjunction therewith and disposed for engaging said first contact at a given time prior to the release of said master member by said trigger, and means for preventing the movement of said second contact into engagement with said first contact during the setting of the shutter.

8. In a photoflash synchronizing device the combination of a photographic shutter including a spring actuated master member, means for setting said master member, a releasable latch mechanism for holding said master member in its set position, and comprising a latch member adapted to releasably engage said master member, and normally moved to a latching position, a trigger movable from a normal inoperative position to a release position during which it engages and moves said latch member to its release position, a first contact adapted to be connected to one side of an electrical circuit including a flash lamp, a second contact adapted to be connected to the other side of said circuit, said second contact connected to said trigger to move therewith and into engagement with said first contact when said trigger is moved from its inoperative position to its release position, said trigger, contacts, and latch member disposed relative to one another whereby said second contact is adapted to be moved into engagement with said first contact at a given time prior to the trigger moving said latch member to its release position.

9. In a photoflash synchronizing device the combination of a photographic shutter including a spring actuated master member, means for setting said master member, a releasable latch mechanism for holding said master member in its set position, and comprising a latch member adapted to releasably engage said master member and normally moved to a latching position, a trigger movable from a normal inoperative position to a release position during which it engages and moves said latch member to its release position, a first contact adapted to be connected to one side of an electrical circuit including a flash lamp, a second contact adapted to be connected to the other side of said circuit, said second contact connected to said trigger to move therewith and into engagement with said first contact when said trigger is moved from its inoperative position to its release position, said trigger, contacts, and latch member disposed relative to one another whereby said second contact is adapted to be moved into engagement with said first contact at a given time prior to the trigger moving said latch member to its release position, and means for preventing the contacts from being moved into engagement during the setting of said shutter.

10. In a photoflash synchronizing device the combination of a photographic shutter including a spring actuated master member, means for setting said master member, a releasable latch mechanism for holding said master member in its set position, and comprising a latch member adapted to releasably engage said master member and normally moved to a latching position, a trigger movably from a normal inoperative position to a release position during which it engages and moves said latch member to its release position, a first contact adapted to be connected to one side of an electrical circuit including a flash lamp, a second contact adapted to be connected to the other side of said circuit, said second contact connected to said trigger to move therewith and into engagement with said first contact when said trigger is moved from its inoperative position to its release position, said trigger, contacts, and latch member disposed relative to one another whereby said second contact is adapted to be moved into engagement with said first contact at a given time prior to the trigger moving said latch member to its release position, and means for preventing the contacts from being moved into engagement during the setting of said shutter, said means including a connection between said trigger and said latch member whereby said trigger is not adapted to be moved by movement of said latch member in moving to its latching position upon setting of the master member.

11. In a photoflash synchronizing device a combination of a photographic shutter including a casing, a pivoted master member in said casing, a spring tending to rotate said master member, a setting lever extending radially from said casing and adapted to set said master member, a releasable latch mechanism for holding said master member in a set position, and comprising a pivoted latch member normally spring pressed against the edge of said master member and adapted to engage a notch therein, a trigger pivoted at the pivot point of said latch member and normally spring pressed to an inoperative position, a lug on said latch member adapted to be engaged by said trigger when the same is moved from its inoperative position to its release position whereupon the latch member is adapted to be pivoted to its releasing position, a first contact adapted to be connected to one side of an electrical circuit including a flash lamp and connected to the trigger to move therewith, and a second contact adapted to be connected to the other side of said circuit, said second contact disposed so as to be spaced from said first contact when the trigger is in its normal position and to be engaged by said first contact when said trigger is moved to its release position at a given time prior to the movement of said latch member to its releasing position by said trigger.

WILLIAM A. RIDDELL.